United States Patent
LeMense

[11] Patent Number: 5,710,548
[45] Date of Patent: Jan. 20, 1998

[54] TRANSMITTER DIRECTION IDENTIFIER

[75] Inventor: Thomas John LeMense, Livonia, Mich.

[73] Assignee: Ford Motor Company, Dearborn, Mich.

[21] Appl. No.: 433,184

[22] Filed: May 3, 1995

[51] Int. Cl.⁶ .................. G08C 19/00; G06F 7/04
[52] U.S. Cl. ............... 340/825.69; 340/825.31; 340/825.49; 343/819
[58] Field of Search ........... 340/825.69, 825.72, 340/825.31, 825.49; 343/819, 713; 342/457, 423; 455/38.2

[56] References Cited

U.S. PATENT DOCUMENTS

| | | | |
|---|---|---|---|
| 2,490,777 | 12/1949 | Bryant et al. | 343/120 |
| 2,841,787 | 7/1958 | Knott | 343/101 |
| 2,915,751 | 12/1959 | Van Hutten et al. | 343/119 |
| 2,979,718 | 4/1961 | Newhouse et al. | 343/119 |
| 3,824,595 | 7/1974 | Hall | 343/113 |
| 3,906,505 | 9/1975 | Lipsky | 343/119 |
| 3,940,700 | 2/1976 | Fischer | 325/363 |
| 4,023,176 | 5/1977 | Currie et al. | 343/113 |
| 4,114,157 | 9/1978 | Hirata . | |
| 4,489,327 | 12/1984 | Eastwell | 343/432 |
| 4,763,121 | 8/1988 | Tomoda et al. | 340/825.69 |
| 4,868,915 | 9/1989 | Anderson et al. | 340/825 |
| 4,873,530 | 10/1989 | Takeuchi et al. | 343/711 |
| 4,897,644 | 1/1990 | Hirano | 340/825.69 |
| 4,978,963 | 12/1990 | Thorpe | 342/433 |
| 5,056,106 | 10/1991 | Wang et al. . | |
| 5,319,364 | 6/1994 | Waraksa et al. | 340/825.31 |
| 5,379,033 | 1/1995 | Fujii et al. | 340/825.31 |
| 5,532,709 | 7/1996 | Talty | 343/819 |

FOREIGN PATENT DOCUMENTS

| | | |
|---|---|---|
| 0523602 | 7/1992 | European Pat. Off. . |
| 0596805 | 11/1993 | European Pat. Off. . |

*Primary Examiner*—Michael Horabik
*Assistant Examiner*—Edward Merz
*Attorney, Agent, or Firm*—Mark L. Mollon, Esq.; Roger L. May, Esq.

[57] ABSTRACT

A transmitter direction identifier is disclosed in conjunction with an automotive keyless entry assembly. The transmitter direction identifier includes a transmitter for sending a coded signal; a receiver for receiving the coded signal from the transmitter; a spatial differentiator for identifying the direction of the transmitter relative to a receiver from the coded signal received from the transmitter, the spatial differentiator creating a location signal; and a control unit electrically connected to the spatial differentiator wherein the control unit converts the location signal into command signal for subsequent use.

18 Claims, 4 Drawing Sheets

FIG 4
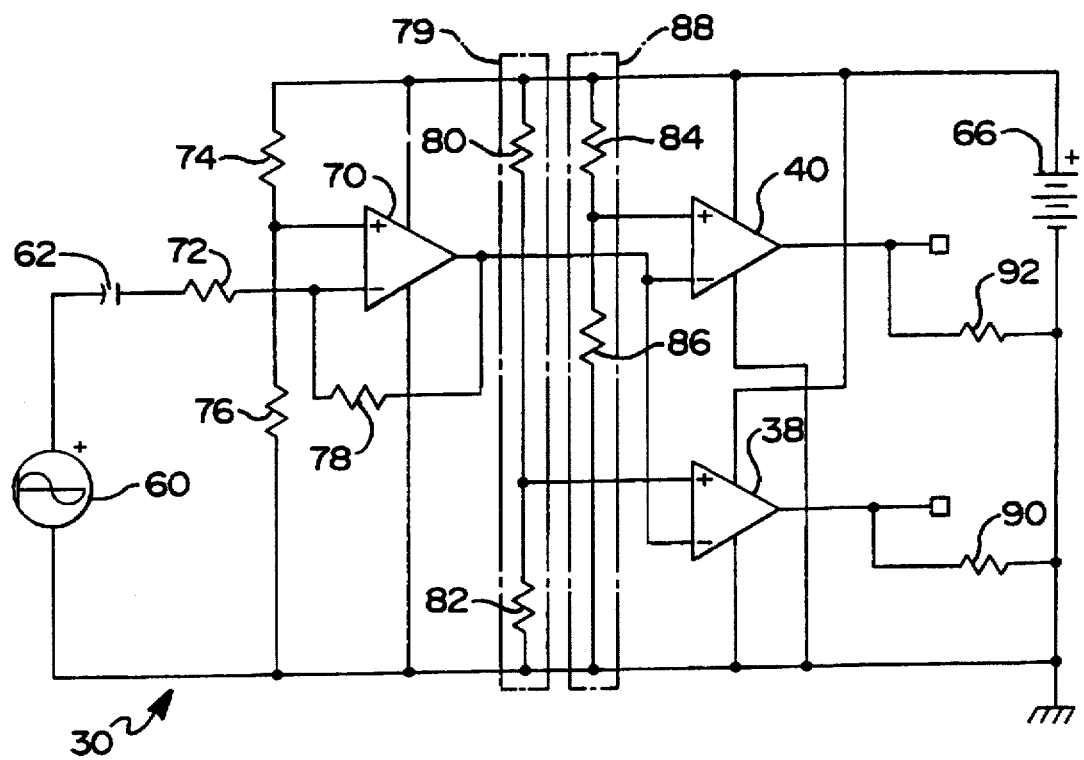
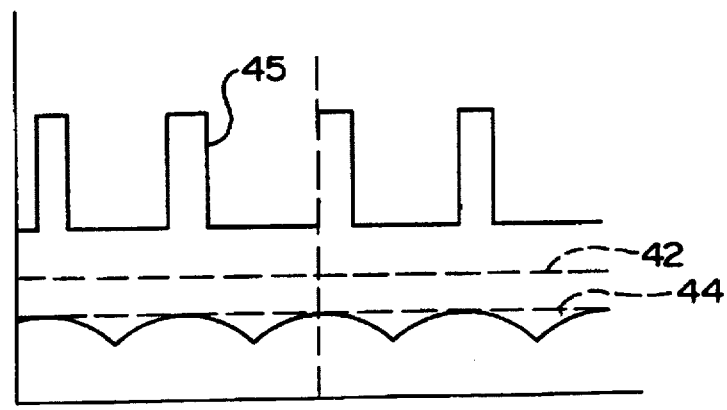
FIG 5

TRANSMITTER DIRECTION IDENTIFIER

BACKGROUND OF THE INVENTION

1. Field of the Invention

The present invention relates to transmitter direction identifiers and, more particularly, to transmitter direction identifiers capable of creating command signals depending on the direction identified.

2. Description of Related Art

Transmitter direction identifiers are complicated in design and construction. Complex designs often increase the size of both the transmitter and the receiver to a burdensome weight inhibiting the portability thereof. In environments where mobility is required, i.e., the automotive environment, these systems are not used. Therefore, it is desired to implement a low cost, low complexity transmitter direction identifier capable of being manually portable.

SUMMARY OF THE INVENTION

Accordingly, the present invention is a transmitter direction identifier. The present invention includes a transmitter for sending a coded signal. A receiver receives the coded signal from the transmitter and a spatial differentiator locates the transmitter relative to the receiver from the coded signal received from the transmitter. The spatial differentiator creates a location signal. A control unit is electrically connected to the spatial differentiator and converts the location signal into a command signal for subsequent use.

The advantages associated with the present invention include providing a low cost, reliable, durable transmitter direction identifier capable of being used in hostile automotive environments.

Other advantages and features of the present invention will be readily appreciated as the same becomes better understood by reference to the subsequent detailed description when considered in connection with the accompanying drawings.

BRIEF DESCRIPTION OF THE DRAWINGS

FIG. 4 is a schematic of the spatial differentiator for one embodiment of the present invention.

FIGS. 5–8 are graphic representations of the receiver output and spatial differentiator output through various conditions.

DESCRIPTION OF THE PREFERRED EMBODIMENT(S)

Figure 1:
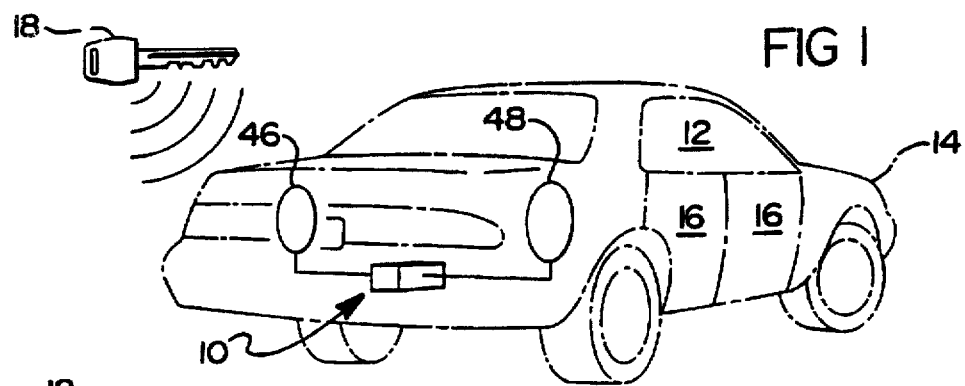
FIG. 1 is a perspective view of the present invention with an automotive vehicle shown in phantom.
Figure 2:
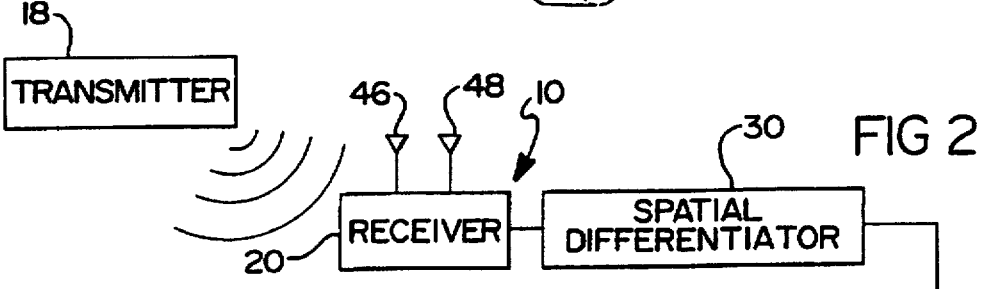
FIG. 2 is a block diagram of one embodiment of the present invention.
Figure 3:
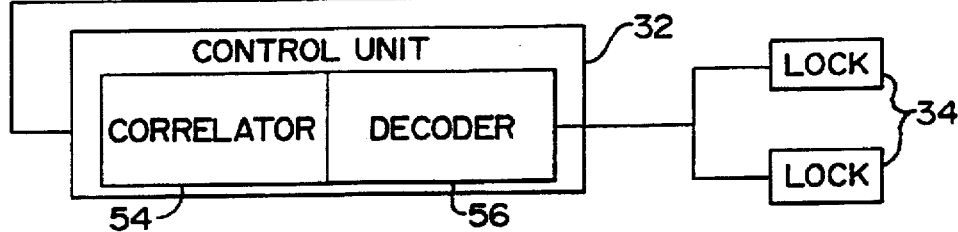
FIG. 3 is a block diagram of the receiver and spatial differentiator of the present invention.
Figure 3:
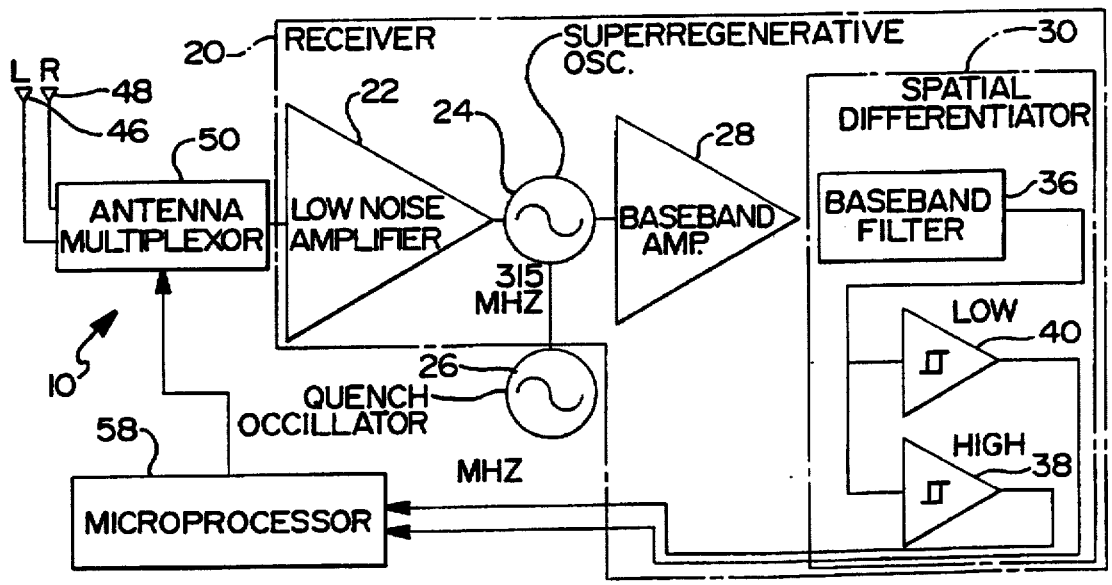

Referring to FIGS. 1–3, one embodiment of the present invention, a transmitter direction identifying assembly, is generally indicated at 10. The transmitter direction identifying assembly 10 is shown in conjunction with automotive keyless entry assembly 11. The transmitter direction identifying assembly 10 and the automotive keyless entry assembly 11 include automatic trunk and light systems, will be discussed together as an example of one embodiment of the present invention. A non-exhaustive list of other embodiments include home entry systems, lighting systems for any type of enclosure and the like. The present invention provides access to an occupant compartment 12 of an automotive vehicle 14 by unlocking at least one of a plurality of doors 16. In one embodiment, the automotive keyless entry assembly 11 uses the transmitter direction identifying assembly 10 to unlock the doors on one side of the automotive vehicle 14 at a time. More specifically, the automotive keyless entry assembly 11 unlocks one or two doors of a two door automotive vehicle or a four door automotive vehicle, respectively.

A transmitter 18 sends a coded signal to a receiver 20 located within the automotive vehicle 14. Transmission consists of a wake up pulse, eight synchronization pulses and a number of identification pulses or bits to allow for a reasonable number of unique identification codes, e.g., 32 bits. The transmitter 18 is a key grip in one embodiment. In other embodiments, the transmitter 18 may be a key fob or a credit card sized device which can be stored in the wallet of the operator. The size and appearance of the transmitter 18 is not a part of the present invention.

The receiver 20 receives the coded signal from the transmitter 18. In one embodiment, the receiver 20 includes a low noise amplifier 22 which amplifies the coded signal and transmits the amplified signal to a super regenerative oscillator 24. The super regenerative oscillator 24 is gated by a quench oscillator 26 and provides a means for further amplifying and detecting the coded signal. The super regenerative oscillator 24 is operating at 315 Mhz whereas the quench oscillator 26 is operating at approximately 1 Mhz. A base band amplifier 28 receives the amplified coded signal after it passes through the oscillators 24, 26 for further amplification. The receiver 20 is a UHF receiver in one embodiment.

A spatial differentiator 30 locates a transmitter 18 relative to the automotive vehicle 14. The spatial differentiator 30 locates the transmitter 18 from the coded signal received from the receiver 20. The spatial differentiator 30 creates a location signal from the coded signal. The spatial differentiator 30 will be further discussed subsequently.

The transmitter direction identifying assembly 10 in this embodiment further includes a control unit 32 which is electrically connected to the spatial differentiator 30. The control unit 32 converts the location signal into an unlock signal to unlock the locking mechanism 34 associated with one of the plurality of doors 16 closest to the transmitter 18. In the case of a four door automotive vehicle, as depicted in FIG. 1, the control unit 32 would send an unlock signal to two of the unlocking mechanisms associated with the two doors 16 which are on the same side of the automotive vehicle 14 as the transmitter 18. If the receiver 20 is unable to determine which side the transmitter 18 is on with respect to the automotive vehicle 14, the control unit 32 will unlock the locks 34 associated with the doors 16 adjacent the driver seat as a default parameter.

With reference to FIG. 3, the spatial differentiator is shown to include a base band filter 36. In one embodiment, the cutoff frequency, $f_c$, is approximately 50 kHz. Once the signal passes through the base band filter 36, it is sent into a high comparator 38 and a low comparator 40. The high comparator 38 defines a high threshold 42 whereas the low comparator 40 defines a low threshold 44. The comparators 38, 40 compare the coded signal received thereby against the high threshold 42 and low threshold respectively, and creates a digital output 47, representing the portion of the signal which exceeds the high threshold 42 and low threshold To determine the location of the transmitter, the transmitter direction identifying assembly 10 includes a first antenna 46 and a second antenna 48. The first antenna 46 and second antenna 48 are operatively connected to the receiver 20. Each of the first antenna 46 and second antenna 48 receive the coded signal from the transmitter 18. The antennas 46, 48 are directional. The antennas 46, 48 are spaced apart and located in the rear quarter panels of the automotive vehicle 14. Although not necessary, the antennas 46, 48 are spaced such that their signal receiving areas overlap slightly.

An antenna multiplexor 50 is electrically connected between both the first antenna 46 and the second antenna 48 and the receiver 20 to alternately transmit the first and second antenna signals to the receiver 20. The antenna multiplexor 50 switches between the two antennas 46, 48 and is controlled by the control unit 32. The antenna multiplexor 50 allows each of the two antennas 46, 48 to transmit the antenna signals received therefrom to the receiver 20 for equal amounts of time.

Figure 6:
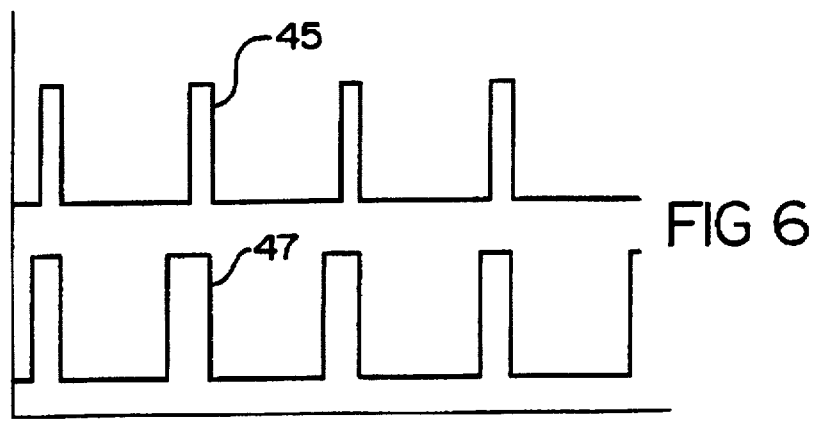
Figure 7:
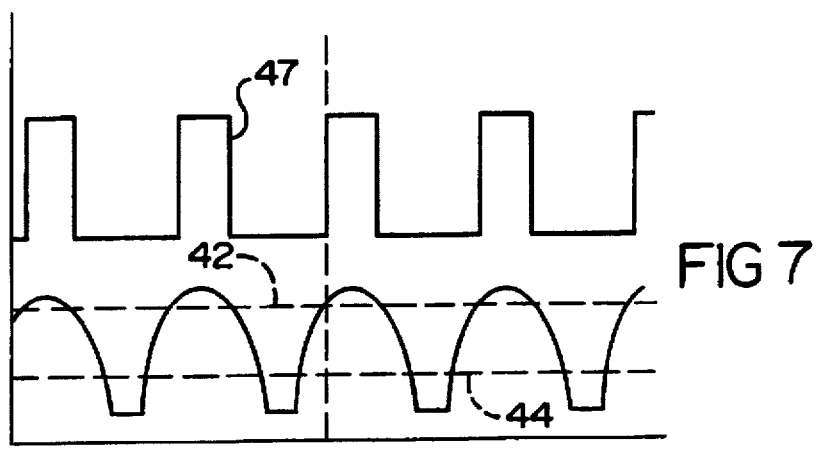
Figure 8:
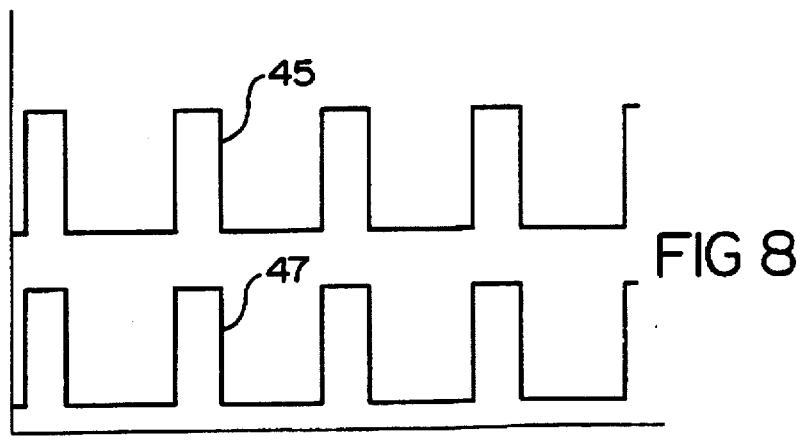

The control unit 32 includes a correlator 54 which correlates the high pulse width signal with the low pulse width signal of their respective antenna signals. With reference to FIGS. 6 and 8, two representations of possible correlations are shown for the passenger side antenna 48. If, for example, the transmitter 18 is on the passenger side of the automotive vehicle 14, a high pulse width correlation between the high comparator signal and low comparator signal would occur, shown in FIG. 8. Likewise, in the same example, the driver side antenna, or first antenna 46, would have a low pulse width correlation between the low comparator signal and the high pulse width signal, as depicted in FIG. 6. More specifically, the correlator 54 correlates the pulse width of the signals which are created by comparing the antenna signals with the high and low thresholds. In the above example, because the transmitter 18 is on the passenger side of the automotive vehicle 14, the passenger side or second antenna 48 receives a relatively strong signal allowing large pulse widths for both the high pulse width and low pulse width signal. The driver side or first antenna 46 produces, however, a slightly weaker signal because the transmitter 18 is further from the driver side antenna 46. Therefore, the weaker signal cannot produce such a large pulse width for the high pulse width signal and, therefore, the pulse widths are substantially unequal to each other. The control unit 32 can then determine that because the pulse widths of the passenger side antenna 48 have a high correlation, the transmitter 18 must be located to the passenger side of the automotive vehicle 14.

The control unit 32 further includes a decoder 56 which decodes the decoded signal from the transmitter 18. The control unit 32 determines the coded signal matches the signal the control unit is programmed to receive and unlocks the specific locks 34. If the coded signal is not decoded to match what should be received, the locks 34 will remain locked preventing access to the occupant compartment 12 through any of the doors 16.

The control unit 32 which includes the correlator 54 and decoder 56, is a microprocessor 58, shown in FIG. 3. The microprocessor 58 may be any commercially available product.

With reference to FIG. 4, the schematic of the spatial differentiator 30 is shown. The signal, as it passes through the receiver 20 and received by the spatial generator 30 is represented by the signal generator 60. The signal is coupled to the spatial differentiator 30 through a capacitor 62. The capacitor 62 is connected to the inverting input of an operational amplifier (op amp) 70 through a first resistor 72. The non-inverting input of the op amp 70 is connected to the power source 66 through a second resistor 74.

The non-inverting input of the op amp 70 is also connected to ground through a third resistor 76. A feedback loop is created by connecting the output of the op amp 70 to the inverting input of the op amp 70 through a fourth resistor 78. The output of the op amp 70 is also connected to the inverting inputs of both the high comparator 38 and the low comparator 40. A first voltage divider 79 is created by a fifth resistor 80 and sixth resistor 82. Seventh and eighth resistors 84, 86 create a second voltage divider 88. The sixth resistor 82 and the eighth resistor 86 have different values such that the voltage is divided differently between the two voltage dividers 79, 88. The differing voltage divisions create the high threshold 42 and low threshold 44. Both of the voltage dividers 78, 88 extend between the power source 66 and ground. The non-inverting input of the high comparator 38 is connected between the fifth and sixth resistors 80, 82 of the first voltage divider 79. The non-inverting input of the low comparator 40 is connected between the seventh and eighth resistors 84, 86 of the second voltage divider 88. The outputs of the high comparator 38 and the low comparator 40 are connected to the microprocessor 58 for processing by the control unit 32. Ninth resistor 90 and tenth resistor 92 are connected between the output of the high comparator 38 and the low comparator 40, respectively, and ground. The op amp 70 and, the high comparator 38, and the low comparator 40, are all powered by the power source 66 and grounded to a common ground.

Figure 9:
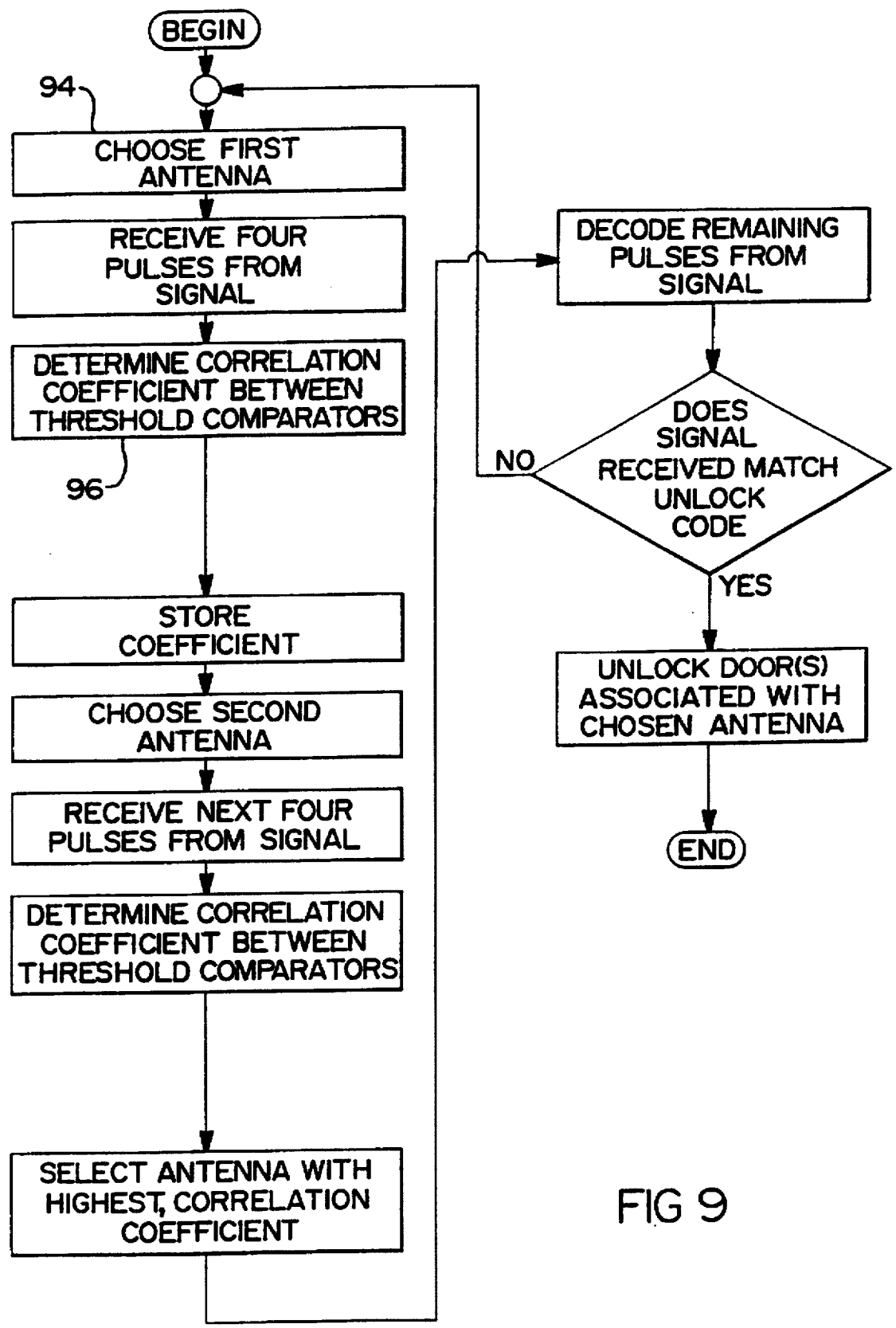
FIG. 9 is a flow chart representing the steps performed by the present invention.

In operation, the microprocessor 58 chooses the first antenna as represented by block 94 in FIG. 9. The microprocessor 58 chooses the first antenna by switching the antenna multiplexor 50. The receiver 20 receives four pulses from the signal received from the first antenna 46. The spatial differentiator 30 receives the signal, creates two signals corresponding to the high threshold 42, and low threshold 44, and sends the two signals to the microprocessor 58. The microprocessor 58 then determines as represented by block 96, the correlation coefficient for the first antenna 46. The coefficient is stored in the microprocessor 58 for future use. The microprocessor 58 then chooses the second antenna 48, using the antenna multiplexor 50 and, similarly, receives four pulses of the signal and determines the correlation coefficient therefor. The antenna with the highest correlation coefficient is then selected. In one embodiment, if the correlation coefficient exceeds 0.7, the antenna associated with that correlation coefficient is selected. More specifically, a selection is made to use the antenna with the highest correlation coefficient when the correlation coefficient exceeds 0.7, indicating a transmitter 18 is in close proximity to the receiver 20 and, hence, the automotive vehicle 14. The remaining pulses of the signal are then decoded and depending if the signal received matches the unlock code stored in the microprocessor 58, the doors 16 associated with the chosen antenna are unlocked. It can be appreciated by those skilled in the art that four antennas may be used instead of two antennas 46, 48 to further delineate the location of the transmitter 18 to unlock a single door in a four door automotive vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A transmitter direction identifying assembly comprising:

a transmitter for sending a coded signal;

a receiver for receiving the coded signal from said transmitter;

a spatial differentiator for locating said transmitter relative to said receiver, said spatial differentiator creating a location signal identifying direction of said transmitter relative to said receiver; and wherein said spatial differentiator includes a high comparator and a low comparator, said high comparator defining a high threshold and said low comparator defining a low threshold.

2. An automotive keyless entry assembly for accessing an occupant compartment of an automotive vehicle by unlocking a locking mechanism associated with one of a plurality of doors, said automotive keyless entry assembly comprising:

a transmitter for sending a coded signal;

a receiver for receiving the coded signal from said transmitter;

a spatial differentiator for locating said transmitter relative to the automotive vehicle from said coded signal received from said receiver, said spatial differentiator creating a location signal;

a control unit electrically connected to said spatial differentiator, said control unit converting said location signal into an unlock signal to unlock the locking mechanism associated with one of the plurality of doors closest to said transmitter; and wherein said spatial differentiator includes a high comparator and a low comparator, said high comparator defining a high threshold and said low comparator defining a low threshold.

3. An automotive keyless entry assembly as set forth in claim 2 wherein first and second antennas are operatively connected to said receiver, each of said first and second antennas receiving said coded signal and for producing first and second antenna signals.

4. An automotive keyless entry assembly as set forth in claim 3 wherein an antenna multiplexor is electrically connected between said first and second antennas and said receiver to alternately transmit said first and second antennas signals to said receiver.

5. An automotive keyless entry assembly as set forth in claim 4 wherein said receiver includes a high comparator creating a high pulse width signal from each of said first and second antenna signals and a low comparator creating a low pulse width signal from each of said first and second antenna signals.

6. An automotive keyless entry assembly as set forth in claim 5 wherein said control unit includes a correlator for correlating said high pulse width signal with said low pulse width signal associated with each of said first and second antennas.

7. An automotive keyless entry assembly as set forth in claim 6 wherein said control unit further includes a decoder for decoding said coded signal.

8. An automotive keyless entry assembly as set forth in claim 7 wherein said receiver is a UHF receiver.

9. A method of unlocking one of a plurality of doors to an occupant compartment of an automotive vehicle using a portable transmitter and a plurality of antennas spaced throughout the automotive vehicle, the method comprising the steps of:

transmitting from the portable transmitter a coded signal, to the plurality of antennas;

receiving the coded signals from the portable transmitter;

receiving an antenna signal from each of the plurality of antennas representing the coded signal;

measuring each of the antenna signals against a first threshold;

measuring each of the antenna signals against a second threshold;

locating the transmitter based on the antenna signals; and unlocking one of the plurality of doors closest to the transmitter.

10. A method as set forth in claim 9 including the step of decoding the coded signal to identify the transmitter.

11. A method as set forth in claim 10 including the step of creating pulse widths signals from the coded signals.

12. A method as set forth in claim 11 including the step correlating the pulse width signals.

13. A method as set forth in claim 12 including the step of comparing the widths of the pulses in the pulse width signals.

14. A method as set forth in claim 13 including the step of sending the coded signal associated with the pulse width signals having the larger pulse widths to be decoded.

15. A method as set forth in claim 14 including the step of alternating the antenna signal received between each of the plurality of antennas.

16. A method as set forth in claim 15 including the step of comparing each of the pulse width signals to a first threshold.

17. A method as set forth in claim 16 including the step of comparing each of the pulse width signals to a second threshold.

18. A method as set forth in claim 17 including the step of amplifying each of the antenna signals.

* * * * *